United States Patent
Tang et al.

(10) Patent No.: US 11,830,698 B2
(45) Date of Patent: Nov. 28, 2023

(54) CONSTANT CURRENT-CONTROLLED POWER SUPPLY CIRCUIT AND FIELD EMISSION ELECTRON SOURCE

(71) Applicant: NuRay Technology Co., Ltd., Jiangsu (CN)

(72) Inventors: Huaping Tang, Jiangsu (CN); Xiangyu Yin, Jiangsu (CN); Zhanfeng Qin, Jiangsu (CN); Jinsong Pan, Jiangsu (CN); Qinghui Zhang, Jiangsu (CN); Yangwei Zhan, Jiangsu (CN)

(73) Assignee: NuRay Technology Co., Ltd., Jiangsu (CN)

( * ) Notice: Subject to any disclaimer, the term of this patent is extended or adjusted under 35 U.S.C. 154(b) by 0 days.

(21) Appl. No.: 17/772,568

(22) PCT Filed: Apr. 17, 2020

(86) PCT No.: PCT/CN2020/085325
§ 371 (c)(1),
(2) Date: Apr. 28, 2022

(87) PCT Pub. No.: WO2021/082362
PCT Pub. Date: May 6, 2021

(65) Prior Publication Data
US 2022/0375710 A1 Nov. 24, 2022

(30) Foreign Application Priority Data

Oct. 30, 2019 (CN) .......................... 201911047324.X (51) Int. Cl.
*G05F 1/56* (2006.01)
*H01J 35/06* (2006.01)
*G05F 1/565* (2006.01)

(52) U.S. Cl.
CPC ............ *H01J 35/065* (2013.01); *G05F 1/565* (2013.01)

(58) Field of Classification Search
None
See application file for complete search history.

(56) References Cited

U.S. PATENT DOCUMENTS 3,761,799 A * 9/1973 Shuey ..................... G05F 1/595
327/535
7,619,252 B2 * 11/2009 Gruber ................. H03K 17/107
327/434

(Continued)

FOREIGN PATENT DOCUMENTS

CN 201928017 U 8/2011
CN 102566732 A 7/2012

(Continued)

OTHER PUBLICATIONS

PCT International Search Report for PCT Application No. PCT/CN2020/085325 dated Aug. 11, 2020 (6 pages, with English translation).

(Continued)

*Primary Examiner* — Jeffery S Zweizig
(74) *Attorney, Agent, or Firm* — Merchant & Gould P.C.

(57) ABSTRACT

A power supply circuit and a field emission electron source are provided. The power supply circuit includes: field effect transistors $S_i$ coupled in series via drains and sources in sequence, $1 \leq i \leq n$, i and n are natural numbers, $n \geq 2$, and a source of $S_1$ is coupled to a negative electrode of a voltage source, and a drain of $S_n$ is used as an output terminal of the power supply circuit to couple to a load; a first group of diodes $D_{1i}$ coupled in series; a first group of resistors $R_{1j}$, $2 \leq j \leq n$, and i and j are natural numbers; and a voltage control module configured to adjust an output voltage of the voltage (Continued)

source to cause a current passing through the load to be constant; the field effect transistors $S_i$, $1 \leq i \leq n$, operate in a resistive region.

20 Claims, 4 Drawing Sheets

(56) References Cited

U.S. PATENT DOCUMENTS

| | | |
|---|---|---|
| 2009/0189643 A1 | 7/2009 | Nedalgi |
| 2014/0376139 A1 | 12/2014 | Abdelfattah Aly |

FOREIGN PATENT DOCUMENTS

| | | |
|---|---|---|
| CN | 102830784 A | 12/2012 |
| CN | 105811750 A | 7/2016 |
| CN | 110825148 A | 2/2020 |
| JP | H10163835 A | 6/1998 |
| JP | 2002033648 A | 1/2002 |
| JP | 2002290222 A | 10/2002 |
| JP | 2004126112 A | 4/2004 |
| JP | 2006136056 A | 5/2006 |

OTHER PUBLICATIONS

PCT Written Opinion for PCT Application No. PCT/CN2020/085325 dated Aug. 11, 2020 (4 pages).

Japanese Office Action for corresponding Japanese Application 2021-560184 dated Sep. 27, 2022.

* cited by examiner

CONSTANT CURRENT-CONTROLLED POWER SUPPLY CIRCUIT AND FIELD EMISSION ELECTRON SOURCE

CROSS-REFERENCE TO RELATED APPLICATION

This application is a National Stage Application of International Application No. PCT/CN2020/085325, filed on Apr. 17, 2020, which claims priority to Chinese Application No. 201911047324.X, filed on Oct. 30, 2019, all of the contents of which are incorporated herein by reference in their entirety.

TECHNICAL FIELD

The present disclosure relates to a field of electron source emission technology, and more specifically, to a power supply circuit and a field emission electron source using the power supply circuit.

BACKGROUND

A performance of a power supply circuit is critical to a performance of an electronic device. For example, in a field emission electron source product, a performance of the field emission electron source may decrease when a current applied to the field emission electron source circuit changes.

A solid may contain a large number of electrons, which are bound inside the solid due to an attraction of nucleus. Under a normal condition, these electrons do not have enough energy to escape from a surface of an object. Only under an action of a certain external energy or by a method of eliminating electron binding, the electrons may escape from an interior of the solid to a vacuum through the surface. A system capable of producing a large number of electrons directionally in the vacuum is called an electron source. A method is to suppress a surface potential barrier of a material by relying on an external electric field, so as to reduce and narrow the potential barrier. When a width of the potential barrier is narrow enough to be comparable to an electron wavelength, an electron tunneling effect begins to work, and free electrons may smoothly penetrate the surface potential barrier and enter the vacuum. This phenomenon of pulling electrons out of the solid surface using a strong external electric field is a field emission phenomenon. This type of electron source is called a field emission electron source. Research shows that when a field strength of the external electric field reaches $10^6$, an apparent electron emission phenomenon may already occur. There is no time delay in the field emission, and a response speed may reach a microsecond level, that is, the field emission electron source may be turned on and off instantaneously.

Therefore, it is required that a circuit applied to the field emission electron source may maintain a stable current and may respond instantaneously.

SUMMARY

The present disclosure provides a power supply circuit and a field emission electron source using the power supply circuit.

According to an aspect of the present disclosure, there is provided a power supply circuit, including: field effect transistors $S_i$ coupled in series via drains and sources in sequence, wherein $1 \le i \le n$, i and n are natural numbers, $n \ge 2$, and wherein a source of $S_1$ is coupled to a negative electrode of a voltage source, and a drain of $S_n$ is used as an output terminal of the power supply circuit to couple to a load; a first group of diodes $D_{1i}$ coupled in series, wherein $1 \le i \le n$, i and n are natural numbers, $n \ge 2$, and wherein $D_{11}$ is coupled in parallel between a gate of $S_2$ and the negative electrode of the voltage source, and $D_{1n}$ is coupled in parallel between a gate of the $S_n$ and the drain of the $S_n$, the remaining $D_{1i}$ are coupled in parallel between gates of the $S_i$ and gates of $S_{i+1}$ when n>2; a first group of resistors $R_{1j}$, $2 \le j \le n$, wherein $R_{1j}$ are coupled in parallel between the gates of the $S_i$ and the sources of the $S_i$, and wherein a value of j corresponds to a value of i, and i and j are natural numbers; and a voltage control module configured to adjust an output voltage of the voltage source to cause a current passing through the load to be constant; wherein the field effect transistors $S_i$, $1 \le i \le n$, operate in a resistive region.

In some embodiments, the field effect transistors $S_i$, $1 \le i \le n$, are N-channel enhancement type field effect transistors.

In some embodiments, the voltage control module includes: a detection unit coupled in series with the load and configured to detect the current passing through the load, wherein the load is coupled to the output terminal of the power supply circuit; and a control signal generation unit configured to generate a control signal according to the current passing through the load, and apply the control signal to the voltage source.

In some embodiments, the control signal generation unit is configured to: compare the current passing through the load with a set current value; increase the output voltage of the voltage source in response to the current passing through the load being less than the set current value; and reduce the output voltage of the voltage source in response to the current passing through the load being greater than the set current value.

In some embodiments, the power supply circuit further includes: a second group of diodes $D_{2k}$ coupled in parallel, $2 \le k \le n$, wherein cathodes of the $D_{2k}$ are coupled to the gates of the $S_i$, and anodes of the $D_{2k}$ are coupled to the sources of the $S_i$, and wherein a value of k corresponds to the value of i, k and n are natural numbers, and $n \ge 2$.

In some embodiments, the power supply circuit further includes: a third group of diodes $D_{3t}$, $2 \le t \le n$, wherein cathodes of $D_{3t}$ are coupled to the gates of $S_i$, and a value of t corresponds to the value of i; and wherein anodes of $D_{3t}$ receive a control signal output by the voltage control module to turn on or turn off control the field effect transistors $S_i$, wherein t is a natural number, and n is a natural number greater than or equal to 2.

In some embodiments, the detection unit includes a resistance element, an inductance element, or a Hall sensor element.

In some embodiments, the control signal generation unit includes an operational amplifier, a microcontroller, an FPGA, or a single-chip microcomputer.

In some embodiments, the power supply circuit is configured to replace the first group of diodes $D_{1i}$ coupled in series with parallel structures coupled in series, wherein each of the parallel structures comprises a resistor and a capacitor, $1 \le i \le n$, i and n are natural numbers, and $n \ge 2$.

In some embodiments, the power supply circuit further includes: a fourth diode, wherein a cathode of the fourth diode is coupled to the drain of the field effect transistor $S_n$, and an anode of the fourth diode is coupled to one terminal of a second resistor; and the second resistor, wherein another terminal of the second resistor is coupled to ground.

According to another aspect of the present disclosure, there is provided a multipoint field emission electron source, including: at least one power supply circuit according to the embodiments described above; a gate assembly; and at least one cathode; wherein the gate assembly is coupled to a positive electrode of a voltage source in the power supply circuit, and the positive electrode of the voltage source is coupled to ground, and wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

BRIEF DESCRIPTION OF THE DRAWINGS

The following description of the embodiments of the present disclosure in conjunction with the accompanying drawings will make the above and other objectives, features, and advantages of the embodiments of the present disclosure more clear. It should be noted that throughout the drawings, the same elements are represented by the same or similar reference signs.

DETAILED DESCRIPTION OF EMBODIMENTS

In order to make objectives, technical solutions and advantages in the embodiments of the present disclosure more apparent, the technical solutions in the embodiments of the present disclosure will be clearly and completely described below with reference to the drawings of the embodiments of the present disclosure. The embodiments described in detail hereinafter make up only a subset of the embodiments contemplated in view of the present disclosure. Based on the embodiments of the present disclosure, all other embodiments obtained by those of ordinary skilled in the art without carrying out inventive effort also fall within the protection scope of the present disclosure. In the following description, some specific embodiments are provided as illustrative examples for descriptive purposes, and should not be construed as limiting the present disclosure. When it may cause confusion in the understanding of the present disclosure, conventional structures or configurations may be omitted. It should be noted that the shapes and dimensions of components in the figure do not necessarily reflect actual sizes and/or ratios, but merely illustrate the content of the embodiments of the present disclosure.

Unless otherwise defined, the technical or scientific terms used in the embodiments of the present disclosure should have the usual meanings understood by those skilled in the art. The words "first," "second," and the like used in the embodiments of the present disclosure do not indicate any order, quantity or importance, but are only used to distinguish different composition parts.

In addition, in the description of the embodiments of the present disclosure, the term "connected to" or "coupled to" may mean that two components are directly coupled, or that two components are coupled via one or more other components. In addition, these two components may be connected or coupled by wired or wireless means.

In an existing developed field emission X-ray source, a field emission electron source is adopted to generate an electron beam by a field emission, and the field emission electron source may include a part for generating the electron beam (called a cathode) and a part for generating a control electric field. A solid field emission requires a strong electric field, which is also an essential element of a field emission cathode. Through an improvement of a cathode material, a field emission voltage threshold may be greatly reduced to reach a level of several volts per micron (V/um). Therefore, a gate control voltage of the field emission electron source is directly related to a distance between the cathode and the gate, which may be controlled in the order of tens of micrometers (um) to millimeters (mm) by different process methods. Therefore, an operating voltage of the field emission electron source may be several thousand volts (kV).

The embodiments of the present disclosure first propose a power supply circuit, which may be used as a power supply of the above-mentioned field emission electron source. However, it should be understood that the power supply circuit in the embodiments of the present disclosure may also be applied to other occasions, such as a field of electric vacuum.

Figure 1:
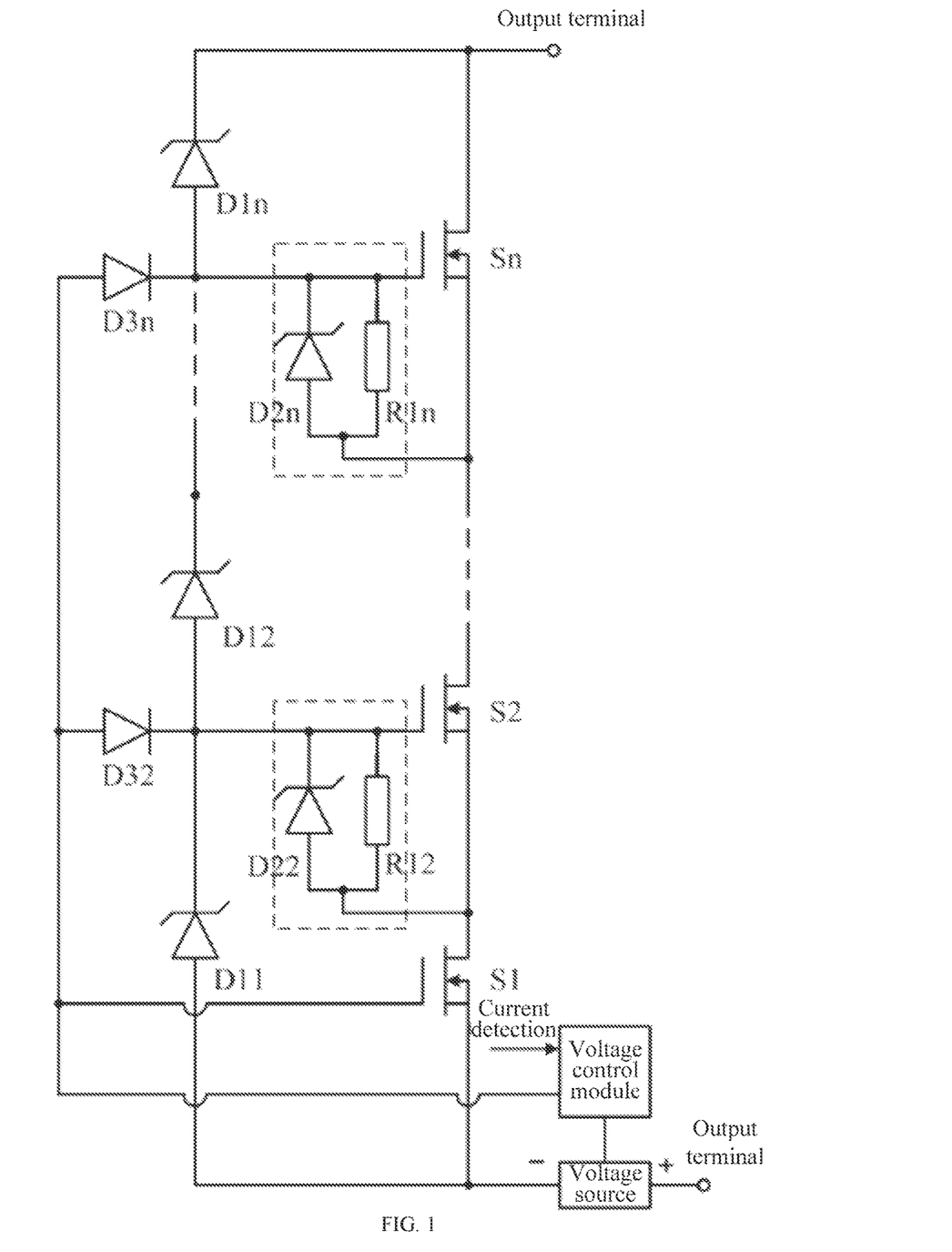
FIG. 1 shows a circuit diagram of a power supply circuit according to an embodiment of the present disclosure.

FIG. 1 shows a circuit diagram of a power supply circuit according to an embodiment of the present disclosure. As shown in FIG. 1, the power supply circuit according to the embodiment of the present disclosure mainly includes field effect transistors $S_i$ coupled in series via drains and sources in sequence, $1 \leq i \leq n$, $n \geq 2$, where i and n are natural numbers. In FIG. 1, a source of $S_i$ is coupled to a negative electrode of a voltage source, a positive electrode of the voltage source is used as an output terminal of the power supply circuit, a drain of the $S_1$ is coupled to a source of $S_2$, a drain of the $S_2$ is coupled to a source of $S_3$, and so on, a drain of $S_{n-1}$ is coupled to a source of $S_n$, and a drain of the $S_n$ is used as the other output terminal of the power supply circuit. A load may be coupled between the two output terminals of the power supply circuit.

As shown in FIG. 1, the power supply circuit further includes diodes (a first group of diodes) $D_{1i}$ coupled in series, $1 \leq i \leq n$, $n \geq 2$, where i and n are natural numbers. As shown in FIG. 1, a diode $D_{11}$ is coupled in parallel between a gate of the $S_2$ and the negative electrode of the voltage source, and $D_{1n}$ is coupled in parallel between a gate of the $S_n$ and the drain of the $S_n$. When n>2, the remaining diodes $D_{1i}$ correspond to the field effect transistors $S_i$ respectively, that is, the remaining diodes $D_{1i}$ are coupled in parallel between gates of the $S_i$ and gates of $S_{i+1}$. For example, the diode $D_{12}$ is coupled in parallel between the gate of the $S_2$ and a gate of the $S_3$, the diode $D_{13}$ is coupled in parallel between the gate of the $S_3$ and a gate of the $S_4$, and so on.

As shown in FIG. 1, the power supply circuit further includes a voltage control module, which may adjust an output voltage of the voltage source to cause a current passing through the load to be constant.

According to the embodiments of the present disclosure, as shown in FIG. 1, the power supply circuit may further include diodes (a second group of diodes) $D_{2k}$ and resistors (a first group of resistors) $R_{1j}$ coupled in parallel, $2 \leq k \leq n$, $2 \leq j \leq n$, where k, j and n are all natural numbers greater than or equal to 2. In FIG. 1, the diodes (the second group of diodes) $D_{2k}$ are included in a dashed box, which indicates that the diodes $D_{2k}$ are optional components.

As shown in in FIG. 1, a value of k corresponds to a value of j, and corresponding diodes $D_{2k}$ and resistors $R_{1j}$ are coupled in parallel with each other and then coupled as a whole in parallel between the gates of the field effect transistors $S_i$ and the sources of the field effect transistors $S_i$. Cathodes of the diodes $D_{2k}$ are coupled to the gates of the field effect transistors $S_i$, and anodes of the diodes $D_{2k}$ are coupled to the sources of the field effect transistors $S_i$. For example, a diode $D_{22}$ and a resistor $R_{12}$ are coupled in parallel between the gate of the $S_2$ and the source of the $S_2$, a cathode of the $D_{22}$ is coupled to the gate of the $S_2$, an anode of the $D_{22}$ is coupled to the source of the $S_2$, and so on.

According to the embodiments of the present disclosure, the current feedback module may further include a detection unit and a control signal generation unit. The detection unit is coupled in series with a load coupled to the output terminal of the power supply circuit, so as to detect the current passing through the load. The control signal generation unit may generate a control signal according to the current passing through the load, and apply the control signal to the voltage source, which will be described below in detail in conjunction with specific examples.

The detection unit may be a resistance element, an inductance element or a Hall sensor element, and the embodiments of the present disclosure are not limited thereto. The control signal generation unit may be an operational amplifier, a microcontroller, an FPGA or a single-chip microcomputer, and the embodiments of the present disclosure are not limited thereto.

According to the embodiments of the present disclosure, the control signal generation unit is configured to compare the current passing through the load with a set current value, increase the output voltage of the voltage source when the current passing through the load is less than the set current value, and reduce the output voltage of the voltage source when the current passing through the load is greater than the set current value.

According to the embodiments of the present disclosure, the field effect transistors $S_i$, 1≤i≤n, are N-channel enhancement type field effect transistors, which may significantly simplify a circuit structure. In addition, all the field effect transistors $S_i$, 1≤i≤n, may be turned on or off according to the control signal applied to the gate. When the field effect transistors $S_i$, 1≤i≤n, are turned on, the field effect transistors $S_i$ operate in a resistive region, and when the field effect transistors $S_i$, 1≤i≤n, are turned off, the field effect transistors $S_i$ are in a pinch-off region.

A control of a gate circuit of the field effect transistor $S_i$ may also be achieved by the control signal generation unit in the voltage control module. The power supply circuit shown in FIG. 1 may further include a third group of diodes $D_{3t}$, 2≤t≤n. A cathode of the $D_{3t}$ is coupled to the gate of the $S_i$, and a value of t corresponds to the value of i. An anode of the $D_{3t}$ receives the control signal output by the voltage control module so as to turn on or turn off the field effect transistor $S_i$, where i and t are natural numbers, and n is a natural number greater than or equal to 2.

In the embodiments of the present disclosure, a constant output current of the power supply circuit may be achieved by adjusting the output voltage of the voltage source, and a high voltage and a fast response may be achieved by simultaneously turn on and simultaneously turn off the plurality of field effect transistors coupled in series.

The power supply circuit will be described in more detail below in conjunction with specific examples.

Figure 2:
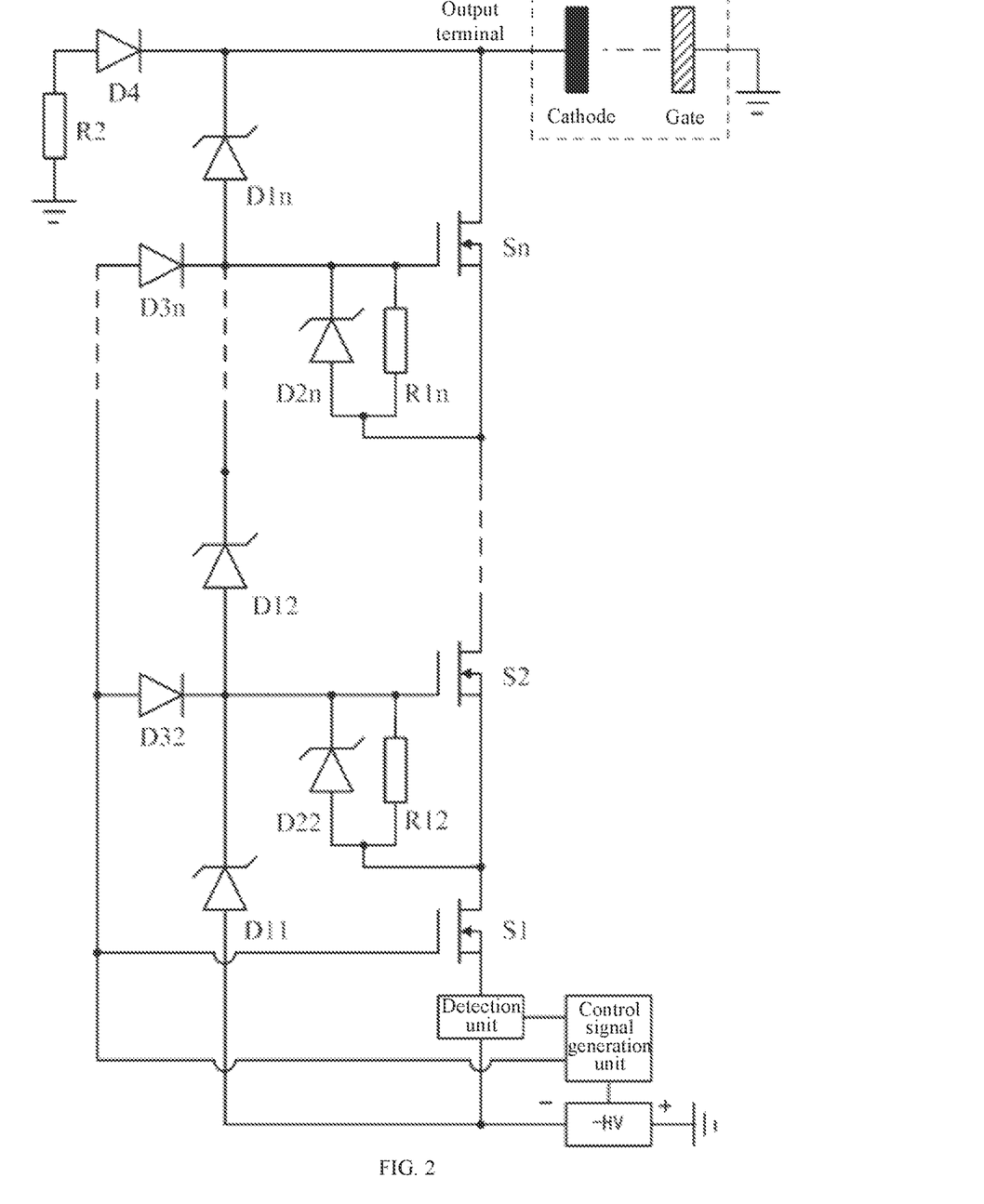
FIG. 2 shows a circuit diagram of a single-channel field emission electron source according to an embodiment of the present disclosure.

FIG. 2 shows a circuit diagram of a single-channel field emission electron source according to an embodiment of the present disclosure.

As shown in FIG. 2, the circuit includes n field effect transistors $S_1$, $S_2$, ..., $S_n$ coupled in series in sequence, transient voltage suppressors (TVS) or zener diodes $D_{11}$, $D_{12}$, ..., $D_{1n}$, $D_{22}$, ..., $D_{2n}$, $D_4$, diodes $D_{32}$, ..., $D_{3n}$, and resistors $R_2$, $R_{12}$ ... $R_{1n}$. $R_{12}$ ... $R_{1n}$ are coupled in parallel to both terminals of the Zener diodes $D_{22}$ ... $D_{2n}$, respectively. The detection unit is coupled to the source of the field effect transistor $S_1$ so as to detect the current passing through the load. The drain of the field effect transistor $S_1$ is coupled to the source of the field effect transistor $S_2$, the drain of the field effect transistor $S_2$ is coupled to the source of the field effect transistor $S_3$, ..., the drain of the field effect transistor $S_{n-1}$ is coupled to the source of the field effect transistor $S_n$, and the drain of the field effect transistor $S_n$ is coupled to the cathode of the field emission electron source. A cathode of the zener diode $D_{22}$ is coupled to the gate of the field effect transistor $S_2$, an anode of the zener diode $D_{22}$ is coupled to the source of the field effect transistor $S_2$, the resistor $R_{12}$ is coupled in parallel with both terminals of the zener diode $D_{22}$, and so on. A parallel circuit of the zener diode $D_{23}$ and the resistor $R_{13}$ is coupled between the gate of the field effect transistor $S_3$ and the source of the field effect transistor $S_3$, ..., a parallel circuit of the zener diode $D_{2n}$ and the resistor $R_{1n}$ is coupled between the gate of the field effect transistor $S_n$ and the source of the field effect transistor $S_n$. The parallel circuit formed by the zener diode and the resistor may make a gate-to-source voltage $U_{gs}$ of the field effect transistor not exceed an upper limit of the gate-to-source voltage of the field effect transistor. The voltage source may be a negative high voltage source with a negative electrode for outputting a negative high voltage and a positive electrode coupled to the ground.

An anode of the $D_{11}$ is coupled to the source of the field effect transistor $S_1$, a cathode of the $D_{11}$ is coupled to the gate of the field effect transistor $S_2$, an anode of the $D_{1n}$ is coupled to the gate of the field effect transistor $S_n$, and a cathode of the $D_{1n}$ is coupled to the cathode of the field emission electron source. When n≥2, an anode of the $D_{12}$ is coupled to the gate of the $S_2$, a cathode of the $D_{12}$ is coupled to the gate of the $S_3$, and $D_{13}$, ..., $D_{1n-1}$ are coupled to the field effect transistors $S_2$, ..., $S_n$ respectively in a manner similar to that of the $D_{12}$ being coupled to the $S_2$ and the $S_3$. A single field effect transistor has a low withstand voltage, and a high voltage may be shared by connecting a plurality of field effect transistors in series. A maximum voltage between the source and drain of each field effect transistor is determined by an electrical characteristic of the corresponding $D_{1n}$.

Figure 3:
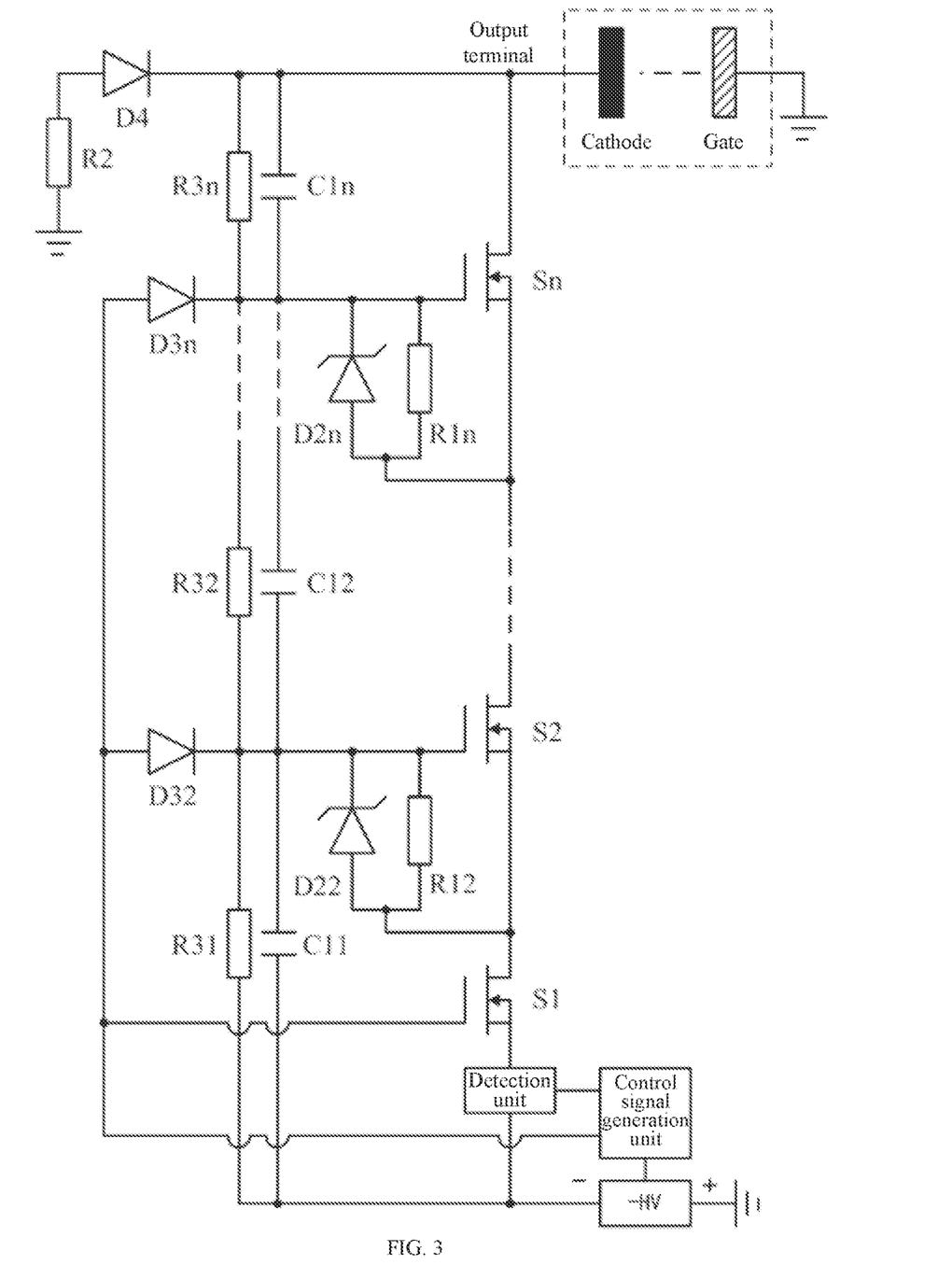
FIG. 3 shows a circuit diagram of a single-channel field emission electron source according to another embodiment of the present disclosure.

In addition to the zener diode, a parallel connection of a resistor and a capacitor may be adopted to balance a source voltage and a drain voltage of the field effect transistor. As shown in FIG. 3, a parallel network formed by a resistor $R_{31}$ and a capacitor $C_{11}$ replaces the zener diode $D_{11}$ in FIG. 2.

One terminal of the resistor $R_2$ is coupled to the ground GND, the other terminal of the resistor $R_2$ is coupled to the anode of the zener diode $D_4$, and the cathode of the diode $D_4$ is coupled to the cathode of the field emission electron source. In this manner, it is possible to discharge electric charges accumulated at the cathode through a loop formed by the zener diode $D_4$ and the resistor $R_2$ when the field emission electron source does not operate.

The anodes of the diodes $D_{32}, \ldots, D_{3n}$ are all coupled to the control signal generation unit, and may receive the control signal from the control signal generation unit and may be turned on or off under the control of the control signal. The cathodes of the diodes $D_{32}, \ldots, D_{3n}$ are coupled to the gates of the corresponding field effect transistors. For example, the cathode of the $D_{32}$ is coupled to the gate of the field effect transistor $S_2$, the cathode of the $D_{33}$ is coupled to the gate of the field effect transistor $S_3$, and so on, the cathode of the diode $D_{3n}$ is coupled to the gate of the field effect transistor $S_n$. A combination of the diode $D_{3n}$ and the field effect transistor may protect the control signal generation unit and prevent the control signal generation unit from being reversely broken down by a gate voltage of the field effect transistor.

After the system is started, the voltage source may output a negative high voltage, and the control signal generation unit may control a gate signal of the field effect transistor, for example, turn on or turn off $S_1, \ldots, S_n$ uniformly. When the field effect transistors $S_1, \ldots, S_n$ are turned on, a potential of the cathode of the field emission electron source may reach the output voltage of the voltage source, and a potential difference between the cathode and the gate of the field emission electron source is greater than a critical value of field emission, then the cathode may emit electrons to the gate. At this time, the gates, the cathodes, $S_n, \ldots, S_1$, the detection unit, the voltage source and the ground constitute a current loop.

The control signal generation unit may adjust the negative high voltage output by the voltage source based on a result of comparing the current passing through the load with the set current value, and an adjustment range may reach 0 v to several Kv.

The detection unit may detect a magnitude of the current passing through the field emission electron source, and feedback the detected current value to the control signal generation unit. The detection unit may be implemented in various ways. For example, a current sampling resistor, an induction coil or a Hall sensor is usually used to achieve a current collection function.

The control signal generation unit may receive the detected current value, and adjust the negative voltage output by the voltage source by comparing the detected current value with the set current value, so as to achieve a constant current in the loop. The control signal generation unit may be built in various ways, such as using an operational amplifier or using an MCU with DA and AD.

The power supply circuit provided by the embodiments of the present disclosure apts to expand. The power supply circuit may be turned on or off by controlling the field effect transistors $S_1$ to $S_n$ to operate in the resistive region or the pinch-off region, and therefore may be combined with the field emission electron source to form a multipoint field emission electron source, so as to facilitate a control between different channels.

Figure 4:
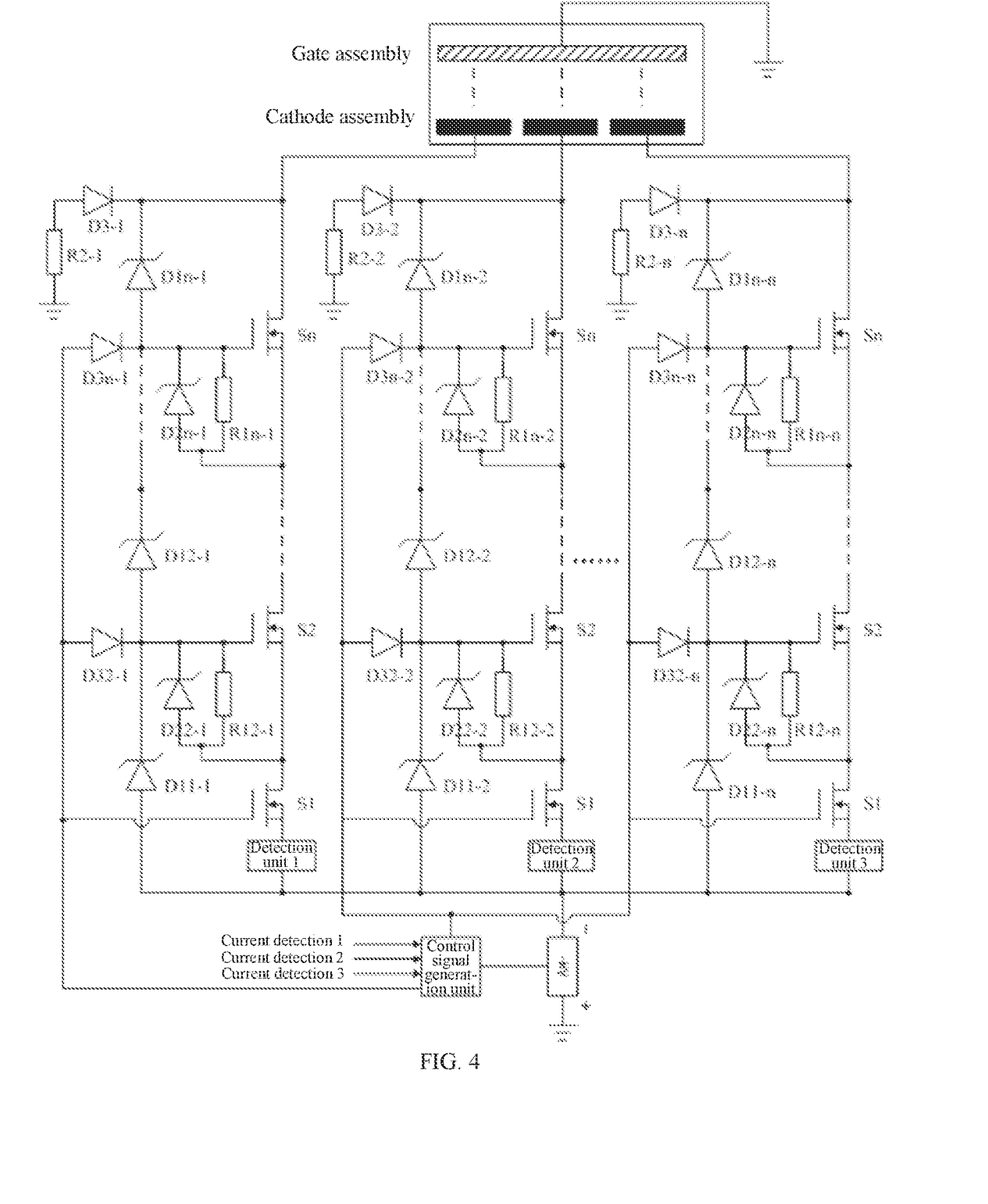
FIG. 4 shows a circuit diagram of a multipoint field emission electron source according to an embodiment of the present disclosure.

FIG. 4 shows a circuit diagram of a multipoint field emission electron source according to an embodiment of the present disclosure. As shown in FIG. 4, the multipoint field emission electron source includes at least one power supply circuit of the embodiments described with reference to FIG. 1 to FIG. 3. Each power supply circuit may constitute a channel, and the power supply circuits are coupled in parallel. The power supply circuits may operate independently of each other, and may be turned on and off independently.

As shown in FIG. 4, the multipoint field emission electron source further includes a gate assembly and at least one cathode. The gate assembly is coupled to the ground. The at least one cathode corresponds to at least one power supply circuit respectively, and the at least one cathode is coupled to the output terminal of the at least one power supply circuit. The plurality of cathodes are arranged in parallel with the gate assembly, and a field emission electric field is formed between each cathode and the gate assembly.

As shown in FIG. 4, the cathode assembly of the multipoint field emission electron source includes a plurality of cathodes, and each cathode may transmit a high-voltage electric field via a corresponding channel. A transmission of each high-voltage electric field corresponds to an independent control signal. It is possible to transmit only one high-voltage electric field at a time.

The embodiments of the present disclosure are conductive to integrate one to hundreds of field emission cathodes in a tube structure and perform a constant current control by adjusting the output voltage of the negative high voltage power supply, so that the circuit may reach a current stable state in milliseconds.

The present disclosure provides a field emission electron source with a high-voltage constant current control system, in which a high voltage required for a cathode field emission is shared by a plurality of field effect transistors in cascade, which may solve a problem of insufficient withstand voltage of a single field effect transistor, increase a circuit operation reliability, and reduce a production cost of a field emission electron source control system. Because the field effect transistor in the high-voltage constant current control system has a characteristic of fast turn-on and turn-off, the field emission electron source with the high-voltage constant current control system may achieve the function of instantaneous startup and shutdown. In addition, through a closed-loop current detection feedback mechanism, an operation current emission of each field emission cathode may be constant, so that a constant current operation mode of the field emission electron source may be achieved.

So far, the present disclosure has been described in conjunction with optional embodiments. It should be understood that those skilled in the art may make various other changes, substitutions and additions without departing from the spirit and scope of the embodiments of the present disclosure. Therefore, the scope of the embodiments of the present disclosure is not limited to the above specific embodiments, but should be defined by the appended claims.

What is claimed is:

1. A power supply circuit, comprising:
   field effect transistors $S_i$ coupled in series via drains and sources in sequence, wherein $1 \leq i \leq n$, i and n are natural numbers, $n \geq 2$, and wherein a source of $S_1$ is coupled to a negative electrode of a voltage source, and a drain of $S_n$ is used as an output terminal of the power supply circuit to couple to a load;
   a first group of diodes $D_{1i}$ coupled in series, wherein $1 \leq i \leq n$, i and n are natural numbers, $n \geq 2$, and wherein $D_{11}$ is coupled in parallel between a gate of $S_2$ and the negative electrode of the voltage source, and $D_{1n}$ is coupled in parallel between a gate of the $S_n$ and the drain of the $S_n$, the remaining $D_{1i}$ are coupled in parallel between gates of the $S_i$ and gates of $S_{i+1}$ when $n>2$;
   a first group of resistors $R_{1j}$, $2 \leq j \leq n$, wherein $R_{1j}$ are coupled in parallel between the gates of the $S_i$ and the sources of the $S_i$, and wherein a value of j corresponds to a value of i, and i and j are natural numbers; and a voltage control module configured to adjust an output voltage of the voltage source to cause a current passing through the load to be constant;

wherein the field effect transistors $S_i$, $1 \leq i \leq n$ operate in a resistive region.

2. The power supply circuit according to claim 1, wherein the field effect transistors $S_1$, $1 \leq i \leq n$ are N-channel enhancement type field effect transistors.

3. The power supply circuit according to claim 1, wherein the voltage control module comprises:
a detection unit coupled in series with the load and configured to detect the current passing through the load, wherein the load is coupled to the output terminal of the power supply circuit; and
a control signal generation unit configured to generate a control signal according to the current passing through the load, and apply the control signal to the voltage source.

4. The power supply circuit according to claim 3, wherein the control signal generation unit is configured to:
compare the current passing through the load with a set current value;
increase the output voltage of the voltage source in response to the current passing through the load being less than the set current value; and
reduce the output voltage of the voltage source in response to the current passing through the load being greater than the set current value.

5. The power supply circuit according to claim 1, further comprising: a second group of diodes $D_{2k}$ coupled in parallel, $2 \leq k \leq n$, wherein cathodes of the $D_{2k}$ are coupled to the gates of the $S_i$, and anodes of the $D_{2k}$ are coupled to the sources of the $S_i$, and wherein a value of k corresponds to the value of i, k and n are natural numbers, and $n \geq 2$.

6. The power supply circuit according to claim 1, further comprising:
a third group of diodes $D_{3t}$, $2 \leq t \leq n$, wherein cathodes of $D_{3t}$ are coupled to the gates of $S_i$, and a value of t corresponds to the value of i; and
wherein anodes of $D_{3t}$ receive a control signal output by the voltage control module to turn on or turn off the field effect transistors $S_i$, wherein t is a natural number, and n is a natural number greater than or equal to 2.

7. The power supply circuit according to claim 1, further comprising:
a fourth diode, wherein a cathode of the fourth diode is coupled to the drain of the field effect transistor $S_n$, and an anode of the fourth diode is coupled to one terminal of a second resistor; and
the second resistor, wherein another terminal of the second resistor is coupled to ground.

8. A multipoint field emission electron source, comprising:
at least one power supply circuit according to claim 1;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

9. The power supply circuit according to claim 2, further comprising:
a fourth diode, wherein a cathode of the fourth diode is coupled to the drain of the field effect transistor $S_n$, and an anode of the fourth diode is coupled to one terminal of a second resistor; and
the second resistor, wherein another terminal of the second resistor is coupled to ground.

10. A multipoint field emission electron source, comprising:
at least one power supply circuit according to claim 2;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

11. The power supply circuit according to claim 3, further comprising:
a fourth diode, wherein a cathode of the fourth diode is coupled to the drain of the field effect transistor $S_n$, and an anode of the fourth diode is coupled to one terminal of a second resistor; and
the second resistor, wherein another terminal of the second resistor is coupled to ground.

12. A multipoint field emission electron source, comprising:
at least one power supply circuit according to claim 3;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

13. The power supply circuit according to claim 5, further comprising:
a fourth diode, wherein a cathode of the fourth diode is coupled to the drain of the field effect transistor $S_n$, and an anode of the fourth diode is coupled to one terminal of a second resistor; and
the second resistor, wherein another terminal of the second resistor is coupled to ground.

14. A multipoint field emission electron source, comprising:
at least one power supply circuit according to claim 5;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

15. The power supply circuit according to claim 6, further comprising:
a fourth diode, wherein a cathode of the fourth diode is coupled to the drain of the field effect transistor $S_n$, and an anode of the fourth diode is coupled to one terminal of a second resistor; and
the second resistor, wherein another terminal of the second resistor is coupled to ground.

16. A multipoint field emission electron source, comprising:
at least one power supply circuit according to claim 6;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

17. A multipoint field emission electron source, comprising:
at least one power supply circuit according to claim 7;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

18. A power supply circuit, comprising:
field effect transistors $S_i$ coupled in series via drains and sources in sequence, wherein $1 \leq i \leq n$, i and n are natural numbers, n≥2, and wherein a source of $S_1$ is coupled to a negative electrode of a voltage source, and a drain of $S_n$ is used as an output terminal of the power supply circuit to couple to a load;
parallel structures coupled in series, wherein each of the parallel structures comprises a resistor $R_{3i}$ and a capacitor $C_{1i}$ coupled in parallel, $1 \leq i \leq n$, i and n are natural numbers, and n≥2, and wherein $R_{31}$ and $C_{11}$ are coupled in parallel between a gate of $S_2$ and the negative electrode of the voltage source, and $R_{3n}$ and $C_{1n}$ are coupled in parallel between a gate of the $S_n$ and the drain of the $S_n$, and the remaining $R_{3n}$ and $C_{1n}$ are coupled in parallel between gates of the $S_i$ and gates of $S_{i+1}$ when n>2;
a first group of resistors $R_{1j}$, $2 \leq j \leq n$, wherein $R_{1j}$ are coupled in parallel between the gates of the $S_i$ and the sources of the $S_i$, and wherein a value of j corresponds to a value of i, and i and j are natural numbers; and
a voltage control module configured to adjust an output voltage of the voltage source to cause a current passing through the load to be constant;
wherein the field effect transistors $S_i$, $1 \leq i \leq n$, operate in a resistive region.

19. The power supply circuit according to claim 18, further comprising:
a fourth diode, wherein a cathode of the fourth diode is coupled to the drain of the field effect transistor $S_n$, and an anode of the fourth diode is coupled to one terminal of a second resistor; and
the second resistor, wherein another terminal of the second resistor is coupled to ground.

20. A multipoint field emission electron source, comprising:
at least one power supply circuit according to claim 18;
a gate assembly; and
at least one cathode;
wherein the gate assembly is coupled to a positive electrode of the voltage source in the power supply circuit, and the positive electrode of the voltage source is coupled to ground, and
wherein the at least one cathode corresponds to the at least one power supply circuit respectively, and the at least one cathode is coupled to one or more output terminals of the at least one power supply circuit, the at least one cathode is arranged in parallel with the gate assembly, and a field emission electric field is formed between each of the cathodes and the gate assembly.

* * * * *